UNITED STATES PATENT OFFICE.

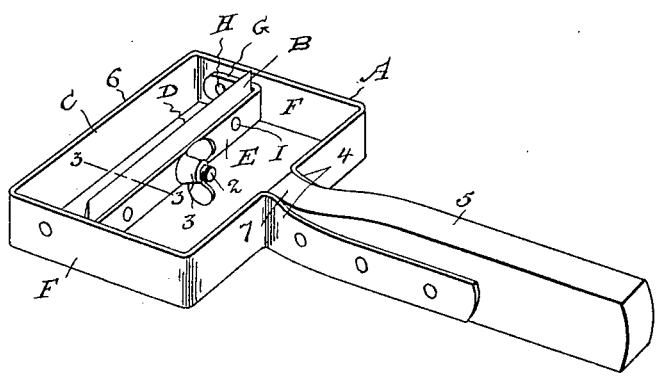

PHILIP WALSH, OF PORT ARTHUR, ONTARIO, CANADA, ASSIGNOR OF ONE-HALF TO LOUIS WALSH, OF PORT ARTHUR, ONTARIO, CANADA.

FISH-SCALER.

1,280,911.      Specification of Letters Patent.      Patented Oct. 8, 1918.

Application filed April 5, 1918. Serial No. 226,912.

*To all whom it may concern:*

Be it known that I, PHILIP WALSH, a subject of the King of Great Britain, of the town of Port Arthur, Thunder Bay District, Canada, have invented certain new and useful Improvements in Fish-Scalers, of which the following is a specification.

My invention relates to improvements in fish scalers, and the object of the invention is to provide a device whereby the scales can be removed from fish without danger of cutting the skin and flesh thereof, and with less labor than is required to remove the scales when using an ordinary knife, and the construction of my invention will be hereinafter particularly set forth and what I claim as new will be pointed out in the claims forming part of this specification.

Figure 1 is a perspective view of my device in inverted position. Fig. 2 is, in part, a side elevation of the device in operative position, the blade and supporting parts thereof being shown in section, and Fig. 3 is a vertical cross section on the line 3—3, Fig. 1.

In the drawings, like characters of reference refer to the same parts.

The device comprises an open frame A substantially of the same depth at all points, and removably supported within this frame is the knife B, which is spaced apart from the front plate C. It will be observed upon referring to Fig. 2 particularly, that the sharpened edge D of this knife normally projects below the frame A. Any suitable means may be employed to hold the knife B in place. The preferred means comprises the cross-plate E, the ends of which are suitably carried by the end members F of the frame A. If desired, the ends of the plate E may be formed substantially at right angles thereto to form flanges G, which flanges are secured by rivets H to the end members F. Carried by the plate E, and projecting beyond one side thereof are a pair of pins I. These pins extend each through a hole J formed in the knife B, and they co-act to position the blade B in proper relationship in respect of the plate E. By any suitable means such as a threaded bolt 2 passing through alined holes (not shown) formed in the knife B and plate E, and the winged nut 3 screwing on said bolt, the knife B is firmly removably held in place.

The frame A is provided after any suitable manner with a handle. To cheapen construction, the plates 4 are integrally formed with the frame A and are bent so as to extend backwardly therefrom and are held in spaced relationship. Positioned between these plates is the handle 5, suitably secured thereto by any suitable fastening means.

In using the device, it is only necessary to press down on the fish's head, and then press slightly down on the knife B and draw the device from the tail toward the head. The knife will effectually remove the scale without injuring the skin of the fish or cutting its flesh. By tilting the frame A outwardly so as to raise the knife B out of contact with the fish, the lower edge 6 of the plate C can be used to remove all loose scales and slime.

The plates 4 are preferably offset to extend partly above the frame A so as to leave a recess or pocket 7 in the handle so as to prevent the forward portion of the hand coming in contact with the fish.

It will of course be understood that the knife B can readily be removed from the frame A, when required, to be sharpened.

The device is very rapid in action and since it consists of very few parts and is strongly made, it cannot get out of order. The open frame A permits the device to be readily cleaned after use.

It will be observed that the cutting edge of the knife B is level, that is to say, all portions thereof occupy the same plane, and, therefore, as the cutting edge wears away there will be no possibility of any sharp corners being formed to cut the skin of the fish. Since the body of a fish is considerably curved, it follows that the wear on the edge D will be greater toward the center of the blade, and in case this edge be appreciably worn, the same can be readily removed and re-sharpened to make the cutting edge level.

Claims:

1. A fish scaler comprising an open substantially rectangular frame of uniform depth, a handle secured to the rear side of said frame, and a flat knife mounted transversely within said frame and spaced apart from the rear and front sides thereof, said knife being arranged with its sharpened edge projecting below said frame.

2. A fish scaler comprising an open substantially rectangular frame of uniform depth, a handle secured to the rear side of said frame, a flat plate mounted transversely within said frame and spaced apart from the front and rear sides thereof, a flat knife positioned against said plate with its sharpened edge below said frame, and means to secure said knife to said plate.

PHILIP WALSH.

Witnesses:
G. R. TAGGART,
N. B. LANGWORTHY.

Copies of this patent may be obtained for five cents each, by addressing the "Commissioner of Patents, Washington, D. C."